(12) United States Patent
Miyazaki

(10) Patent No.: US 6,932,498 B2
(45) Date of Patent: Aug. 23, 2005

(54) VEHICULAR LAMP

(75) Inventor: Takaaki Miyazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 104 days.

(21) Appl. No.: 10/611,700

(22) Filed: Jul. 1, 2003

(65) Prior Publication Data

US 2004/0052087 A1 Mar. 18, 2004

(30) Foreign Application Priority Data

Jul. 4, 2002 (JP) .................................... 2002-195533

(51) Int. Cl.[7] .................................................. F21S 8/10
(52) U.S. Cl. ........................ 362/545; 362/227; 362/800
(58) Field of Search ................................ 362/227, 249, 362/252, 543, 544, 545, 800

(56) References Cited

U.S. PATENT DOCUMENTS

| | | | | |
|---|---|---|---|---|
| 4,503,488 A | * | 3/1985 | Soules et al. ............... | 362/543 |
| 4,733,335 A | * | 3/1988 | Serizawa et al. ........... | 362/545 |
| 4,935,665 A | * | 6/1990 | Murata ....................... | 362/545 |
| 5,418,697 A | * | 5/1995 | Chiou ......................... | 362/545 |
| 6,268,702 B1 | * | 7/2001 | Fleck ......................... | 362/545 |
| 6,561,685 B2 | * | 5/2003 | Weber et al. ............... | 362/545 |

FOREIGN PATENT DOCUMENTS

GB 2 226 875 A 7/1990

* cited by examiner

Primary Examiner—Alan Cariaso
(74) Attorney, Agent, or Firm—Fish & Richardson P.C.

(57) ABSTRACT

In a vehicular lamp, a plurality of LED lines to which a plurality of LEDs are connected in series, are connected in parallel. The LEDs are arranged in a flat plane on a circuit board, the plurality of LEDs are arranged symmetrically with respect to a first centerline of the flat plane. Therefore, even when any one of the LEDs in the plurality of the LED lines becomes incapable of emitting light leading to all of the LEDs connected in series in the LED line to turn off, because the LEDs in the LED line are arranged symmetrically, the symmetrical balance of the LEDs shut down is maintained as an entire lamp, and the overall appearance of the lamp can be preserved.

11 Claims, 10 Drawing Sheets

FIRST CENTERLINE

FIRST CENTERLINE

VEHICULAR LAMP

CROSS-REFERENCE

This claims the benefit of Japanese Application No. P2002-195533 filed Jul. 4, 2002, which is incorporated herein by its entirety.

FIELD OF THE INVENTION

The present invention relates to a vehicular lamp constructed by a light-emitting element, for example, an LED (light-emitting diode), in particular, a vehicular lamp configured to prevent asymmetrical light distribution because of malfunctioned LEDs.

BACKGROUND OF THE INVENTION

Recently, LEDs have been used as a light source for vehicles in view of their increased light luminosity, reliability, and longevity. A plurality of LEDs are often used in a flat plane arrangement. For example, FIG. 10(a) shows LEDs used in a tail lamp for a two-wheeled vehicle. A plurality of LEDs 20 are mounted on a circuit board 15X and arranged longitudinally and laterally in a flat plane. The circuit board 15X is mounted inside a lamp body (not shown), and light from the LEDs radiates through lenses attached on the opening of the front side of the lamp body.

The number of LEDs used in the lamp is increased as the emission area required for the lamp increases. In FIG. 10(a), a plurality of LEDs 20 are arranged on the circuit board 15X in a flat plane and are connected in series to form LED lines L21 to L26, based on the relationship between power supply voltage and current that is applied to emit light. A plurality of the LED lines L21 to L26 are connected in parallel to form an LED group. By connecting each of the LED lines to a switch 31 and an electric power supply 30 via a drive resistance 21, required current is applied to each LED line so that each LED in each LED line can emit light.

However, as shown in FIG. 10(b), once one LED becomes incapable of emitting light (shaded LEDs in the drawing), current is not applied to other LEDs connected by the LED line. Therefore, the overall light intensity is decreased.

In a lamp for two-wheeled vehicles, the lamps may have a right area and a left area, and the areas are configured laterally and symmetrically. When there is a problem with an LED line and renders LEDs incapable of emitting light either in the right or left side area, the difference in intensity of light in the left and right sides.

SUMMARY OF THE INVENTION

A vehicular lamp according to the present invention has a group of LEDs connected in series and a plurality of LED lines each connecting the LEDs in series are connected in parallel. The LEDs are arranged in a flat plane to face the front of the lamp. LEDs connected in series by a LED line are arranged symmetrically with respect to a centerline viewed from the front of the lamp.

One of the LED lines may be arranged on the centerline ("first centerline"). Alternatively, the plurality of LEDs with the LED lines may be arranged on a second centerline that is perpendicular to the first centerline. Another possible configuration is that the front face of the lamp area extending along the first centerline can be partly covered by a vehicle body and separate lamps can be disposed on both sides of the part of the vehicle body.

According to the present invention even when either one of the LEDs in the plurality of the LED lines becomes incapable of emitting light all LEDs in the same LED line become incapable of emitting light, however, because the LEDs in the LED line are symmetrically arranged, a symmetrical balance is maintained.

DETAILED DESCRIPTION OF THE INVENTION

Figure 1:
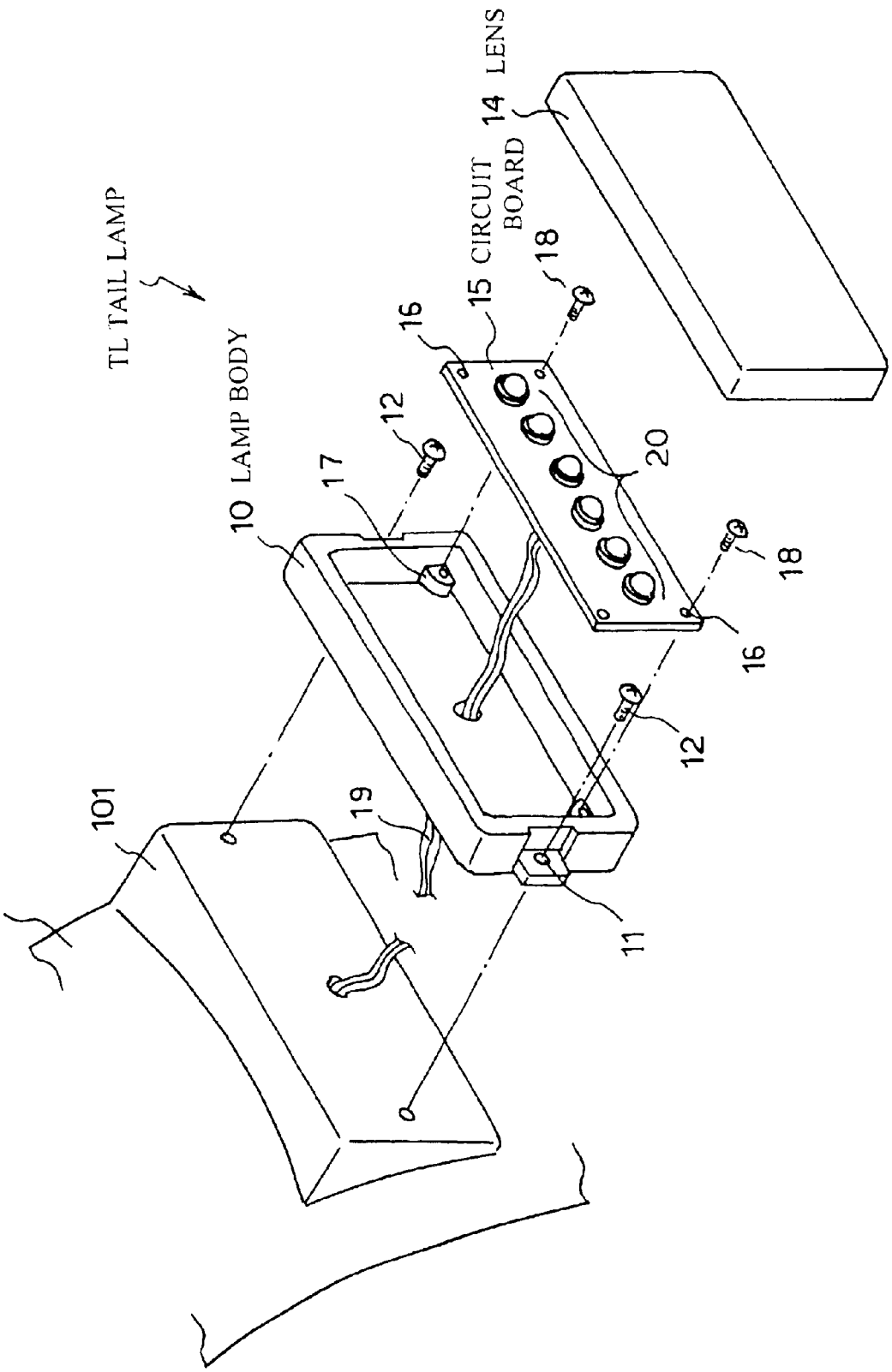
FIG. 1 shows a partially exploded perspective view of a tail lamp of a two-wheeled vehicle according to an embodiment of the present invention.
Figure 2A:
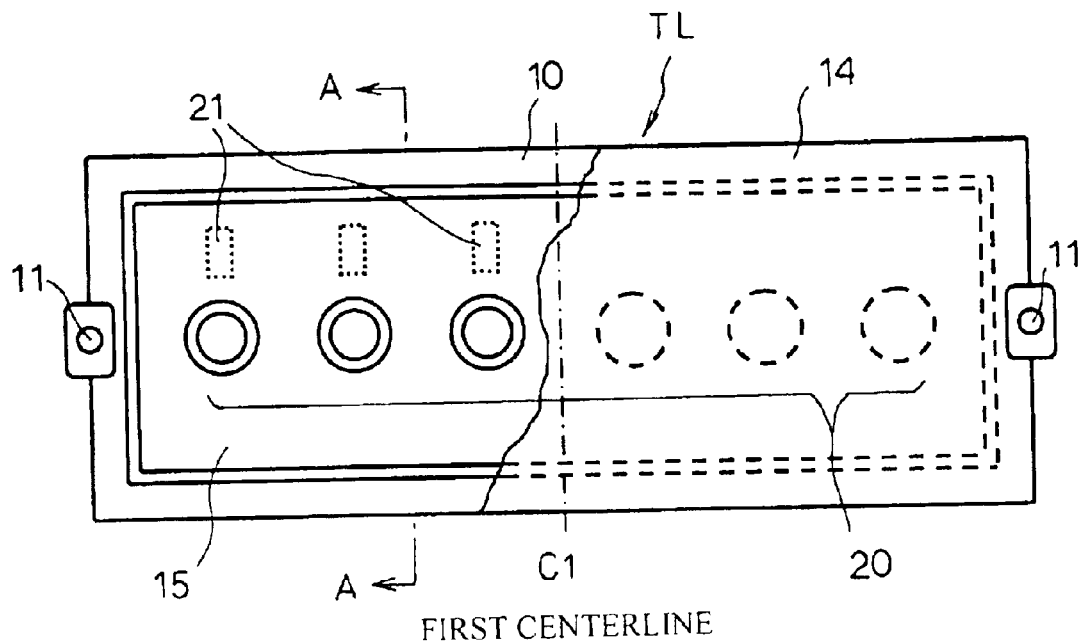
FIG. 2A shows a front elevational view of the tail lamp in FIG. 1.
Figure 2B:
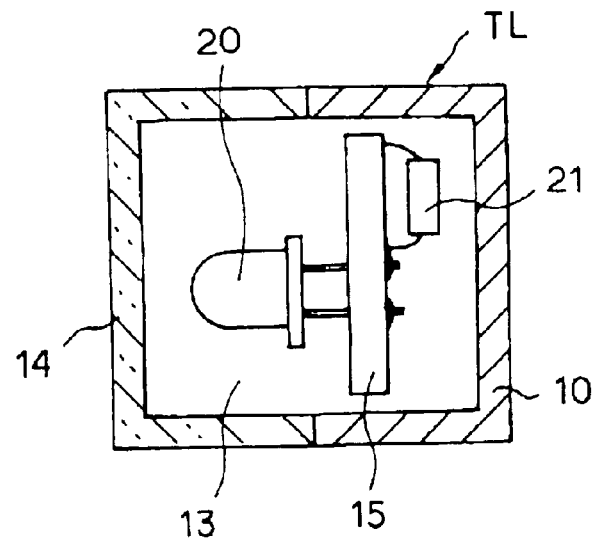
FIG. 2B shows a cross sectional view taken along the line, A—A.

Embodiments of the present invention will be described with reference to drawings. FIG. 1 shows a partially exploded perspective view of an embodiment of a tail lamp of a two-wheeled vehicle (motorbike). FIG. 2A shows a partially exploded front elevational view of the tail lamp and FIG. 2B shows a cross sectional view taken along the line, A—A. The tail lamp TL is formed in a rectangular shape and is fixed and supported by a base 101 integrally formed with a vehicle body 100 at a rear portion of the motorbike body. The tail lamp TL is provided with a lamp body 10, which is like a shallow dish and is fixed to the base 101 with a screw 12 inserted through a screw hole 11 provided on both sides of the lamp body 10. Further, a lens 14 made of molded red resin is hermetically attached to the frontal opening of the lamp body 10 by a method such as welding. A circuit board 15 is mounted inside a lamp chamber 13 constituted by the lamp body 10 and the lens 14, and fixed to a boss 17 provided on the inside face of the lamp body 10 with a screw 18 using a screw hole 16 provided on the circuit board 15. Discrete LEDs 20 are mounted on the circuit board 15 in a flat plane arrangement, each of them electrically connected according to a desired circuit pattern and connected to the electric power supply (not shown) through a code 19 penetrating through the lamp body 10 and the base 101. A drive resistance 21 is also mounted on the circuit board 15 to generate a drive current that allows the LED 20 to emit light.

Figure 3A:
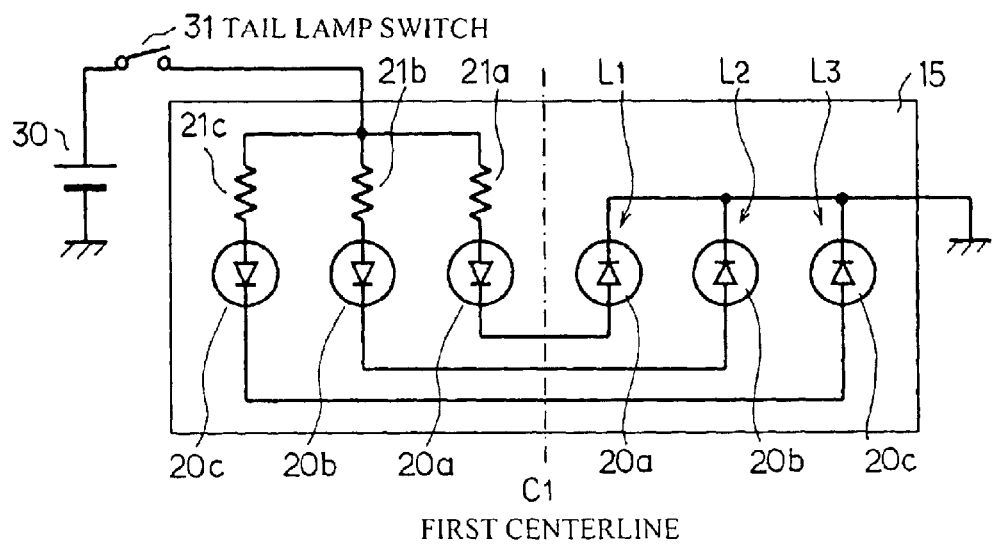
FIG. 3A shows a front elevational view including a circuit configuration of a circuit board of a first embodiment.
Figure 3B:
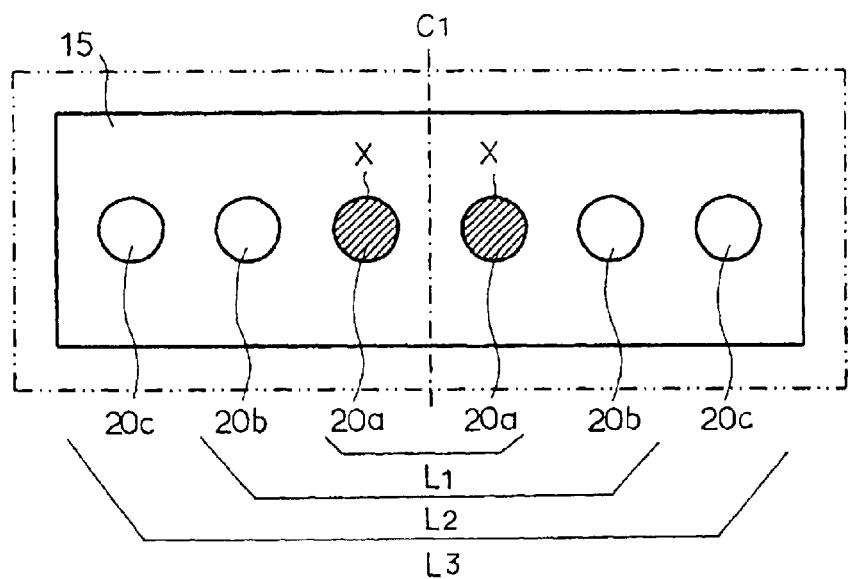
FIG. 3B illustrates a situation where some LEDs are out.

FIG. 3A shows a front elevational view of a first embodiment of the circuit board 15, as well as the circuit configuration where each of the LEDs 20 and the resistance 21 are electrically connected. Although an example of a configuration shows a particular number of LEDs, the number of LEDs is not limited to what is shown. A plurality of LEDs 20 are arranged laterally in line on the surface of the circuit board 15. Particularly, three each are arranged in both on the right and left sides with respect to a centerline in the lateral direction (first centerline) C1 of the circuit board 15. In other words, a right LED 20a and a left LED 20a adjacent to each other and sandwiching the first centerline C1 are connected in series, and a drive resistance 21a mounted on the back side of the circuit board 15 is further connected in series thereto to constitute a first LED line L1. Likewise, a right LED 20b and a left LED 20b externally adjacent to each of the LEDs 20a are connected in series, and a drive resistance 21b is further connected in series thereto to constitute a second LED line L2. Similarly, a right LED 20c and a left LED 20c externally positioned are connected in series, and a drive resistance 21c is further connected thereto to form a third LED line L3. Therefore, the LEDs 20a, 20b and 20c in the first to third LED lines L1, L2 and L3, respectively, are symmetrically arranged with respect to the first centerline C1. Also, the first to third LED lines L1, L2 and L3 are connected in parallel and connected to the electric power supply 30 through the tail lamp switch 31.

In the circuit board 15 with the above configuration, the LEDs 20a, 20b and 20c are symmetrical with respect to the first centerline of the circuit board 15 in the left-right direction and are connected in series, respectively, and constitute the first to third LED lines L1, L2 and L3. When the switch 31 is turned on, in the first to third LED lines L1, L2 and L3, respective drive currents 21a, 21b and 21c are applied, and thus the LEDs 20a, 20b and 20c in the respective LED lines L1, L2 and L3 emit light and the tail lamp TL is lit. When any one of the LED lines, for example, the left LED 20a in the first LED line L1, breaks down and becomes incapable of emitting light as shown in FIG. 3A, because the drive current is not applied to the first LED line L1 including the LED 20a, the right LED 20a in the first LED line L1 also goes out. Therefore, both LEDs symmetrically positioned with respect to the first centerline C1 go out. As an entire tail lamp TL, a balance between left and right is maintained because of the symmetrically disposed LEDs.

Figure 4A:
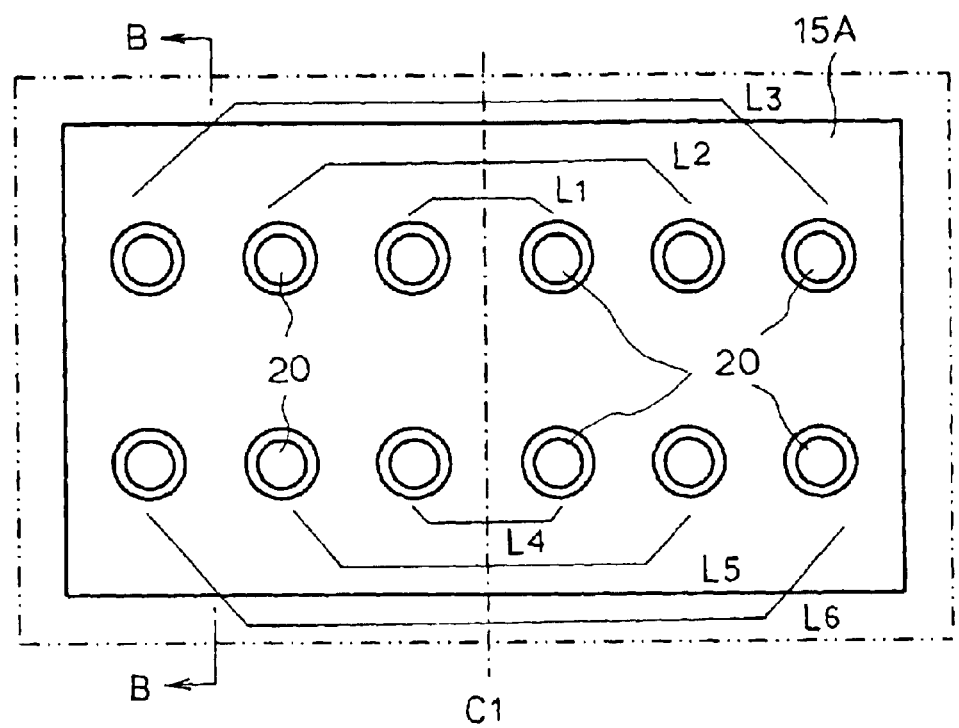
FIG. 4A illustrates a front view of a circuit board of a second embodiment.
Figure 4B:
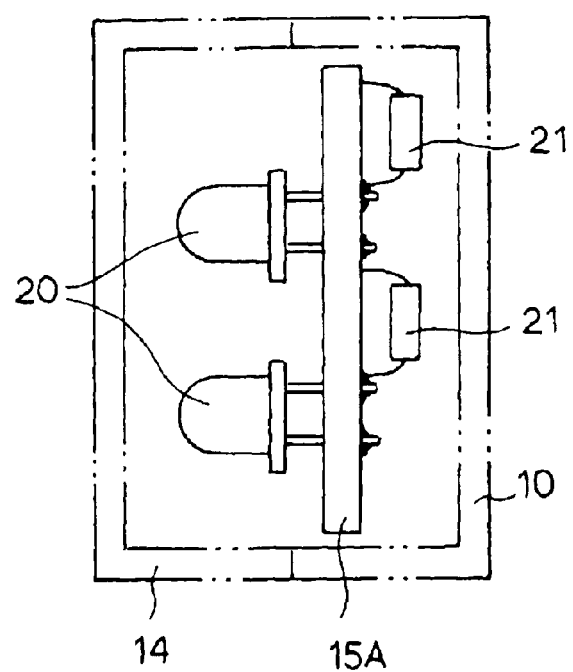
FIG. 4B shows a cross sectional view taken along the line, B—B.
Figure 5A:
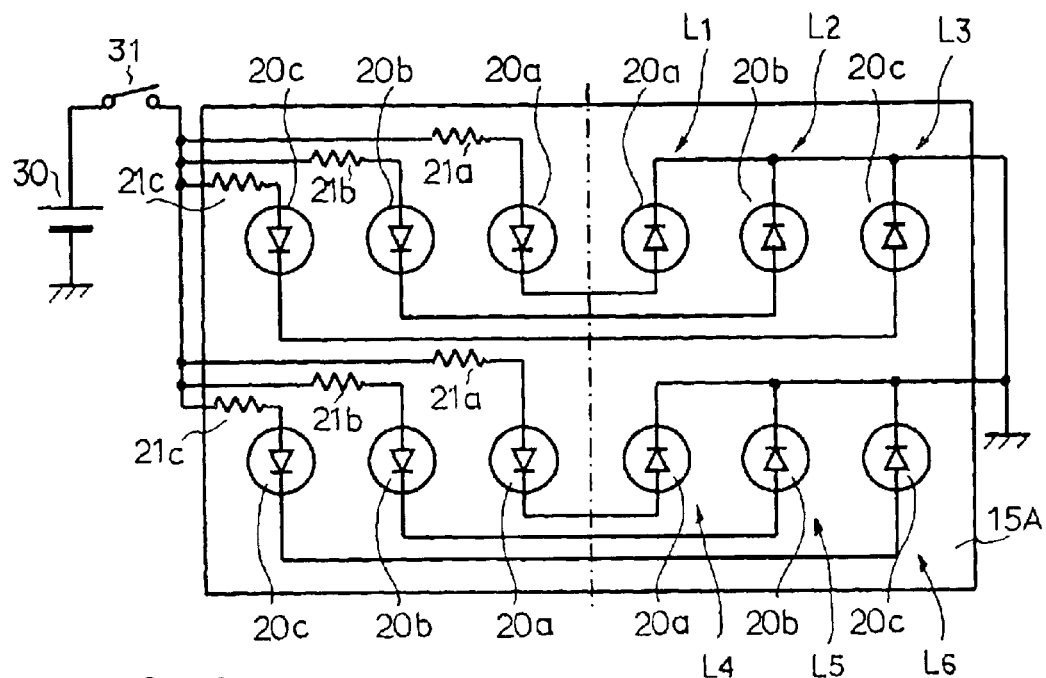
FIG. 5A illustrates a circuit diagram showing a circuit configuration of the second embodiment.

FIG. 4A shows a front elevational view of a second embodiment of a circuit board 15A, and FIG. 4B shows a cross sectional view taken along the line, B—B. They show examples where twelve LEDs 20 are employed. Therefore, as in the first embodiment where six LEDs are arranged laterally in line in a flat plane arrangement, the first to third LED lines L1, L2 and L3 are arranged on the upper side, whereas the fourth to sixth LED lines L4, L5 and L6 with the same circuit configuration as the first to third LED lines are arranged on the lower side. As a result, the LED lines are arranged laterally in two lines. FIG. 5A shows a schematic diagram of the electrical connection of the first to sixth LED lines L1 to L6, in which the first to third LED lines L1, L2 and L3 are connected to the electric power supply 30 through the switch 31 as in the first embodiment, where the LEDs 20a, 20b and 20c are directly connected and include the respective drive resistances 21a, 21b and 21c and are connected in parallel. Since the fourth to sixth LED lines L4, L5 and L6 are the same as the first to third LED lines L1, L2 and L3, a corresponding symbol is given to each LED and drive resistance. Further, the fourth to sixth LED lines L4, L5 and L6 are connected in parallel with the first to third LED lines L1, L2 and L3 and further to the tail lamp switch 31 and electric power supply 30.

Figure 5B:
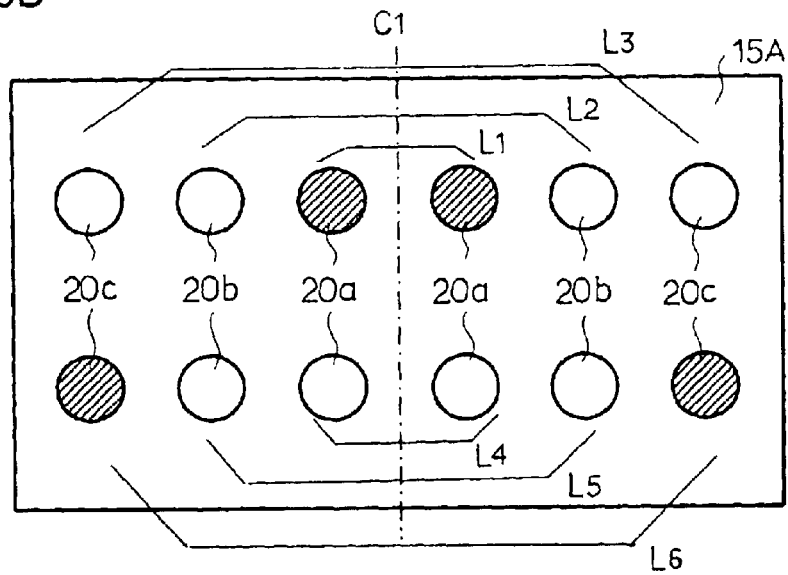
FIG. 5B illustrates a situation where some LEDs are out.

In the second embodiment, if any one of the LEDs in any of the LED lines breaks down and becomes incapable of emitting light, drive current is not applied to the LED line. Thus, the other LEDs in the LED line also shut off. Therefore, as shown in FIG. 5B for example, as in the first embodiment, when one of the LED 20a in the first LED line L1 becomes incapable of emitting light, the other LED 20a also becomes incapable of emitting light. Therefore, the entire first LED line L1 shuts down. Also, at the same time, when the LED 20c in the sixth LED line L6 is incapable of emitting light, the other LED 20c becomes also incapable of emitting light, and the entire sixth LED line L6 becomes incapable of emitting light. Therefore, as the entire tail lamp TL, the LEDs symmetrically positioned with respect to the first centerline C1 shuts down. Thus, a balance between left and right is maintained.

Figure 6A:
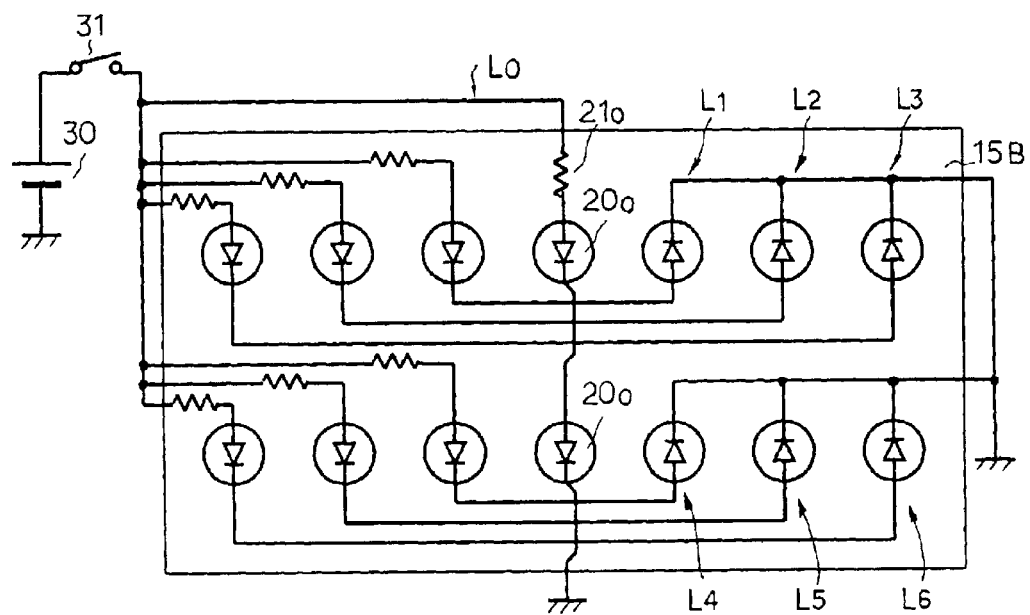
FIG. 6A shows a front elevational view including a circuit configuration of a circuit board of a third embodiment.
Figure 6B:
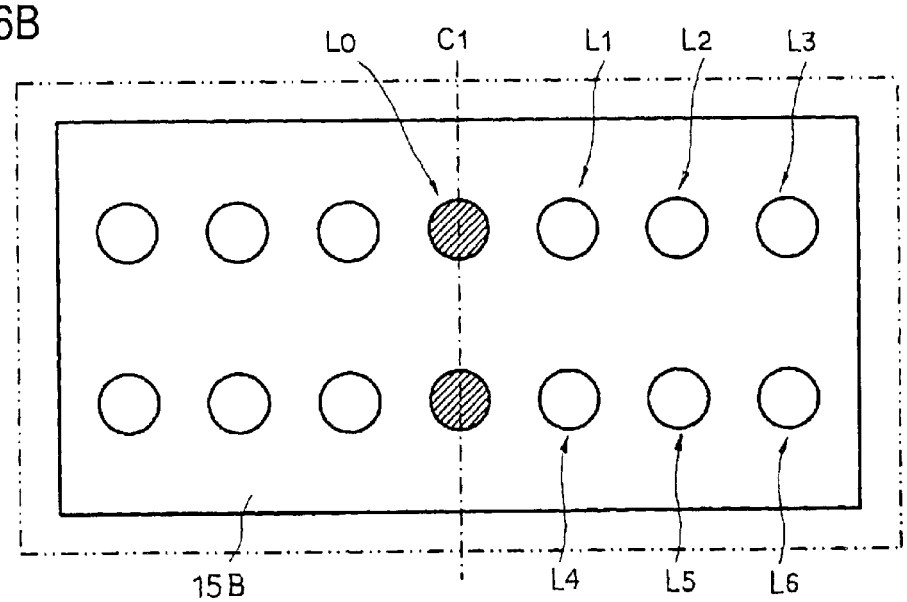
FIG. 6B illustrates a situation where some LEDs are out.

In the above embodiments, an even number of LEDs are arranged laterally. When an odd number of LEDs are used, a central LED line may be arranged at a position of the lateral central line. For example, FIG. 6A shows a front elevational view of a circuit board 15B and its circuit configuration according to a third embodiment, in which a central LED line L0 has been added to the configuration of the second embodiment. The LED line L0 connects an upper LED 20o, lower LED 20o and drive resistance 21o in series, and the first to sixth LED lines L1 to L6 in parallel.

With such LED line L0 provided, when an odd number of LEDs are laterally arranged and the LED 20o in the central LED line L0 becomes incapable of emitting light as shown in FIG. 6A, both the upper and lower LEDs 20o on the first centerline C1 shut down. Therefore, a balance between left and right as an entire tail lamp TL is maintained. Likewise, in the first embodiment, the LED may be arranged on the first centerline C1. In the first embodiment, only one LED is arranged on the first centerline.

Figure 7A:
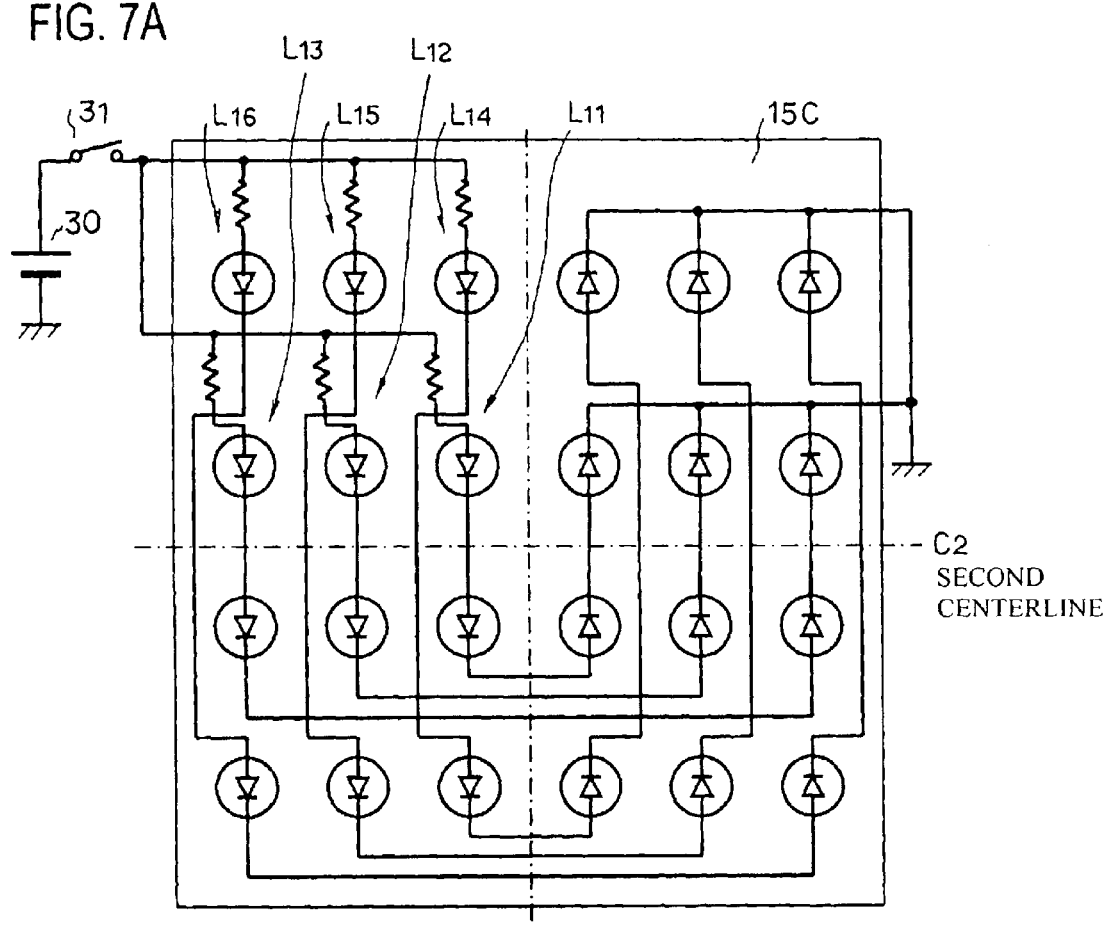
FIG. 7A shows a front elevational view including a circuit configuration of a circuit board of a fourth embodiment.

FIG. 7A shows a circuit configuration of electrical connection of each of the LEDs on a circuit board 15C according to a fourth embodiment. The first to sixth LED lines L11 to L16 are configured such that the corresponding first to sixth LED lines in the second embodiment form four LEDs and one drive resistance, respectively. Here, the LED lines L11 to L16 are not only laterally symmetrical with respect to the first centerline L1 when viewed from the front of the tail lamp TL, but also vertically symmetrical with respect to a centerline (second centerline) C2 in the left-right direction, where two LEDs are vertically and symmetrically arranged with respect to the centerline C2, respectively. Therefore, as a whole, four LEDs are arranged laterally and vertically symmetrically. Numerals for each of the LEDs and drive resistances are omitted.

Figure 7B:
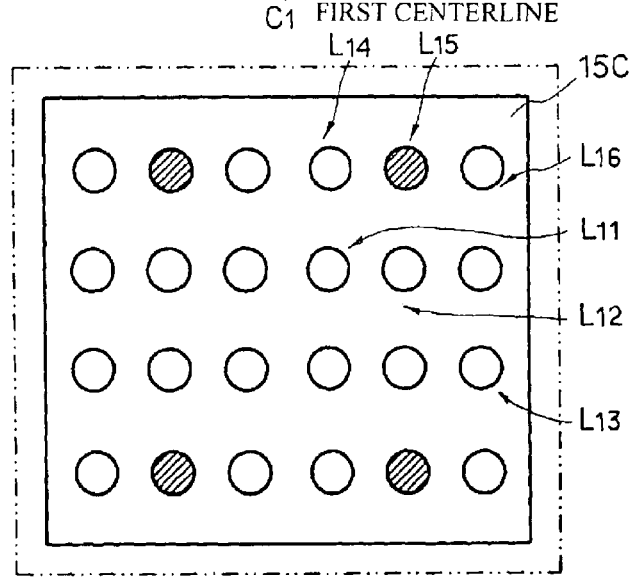
FIG. 7B illustrates a situation where some LEDs are out.

In the fourth embodiment, as shown in FIG. 7B for example, when the LED in the fifth LED line L15 becomes incapable of emitting light, the four LEDs in the fifth LED lines all turn off. However, because the LEDs are symmetrically disposed with respect to the first centerline C1 and the second center line C2, the balance as an overall lamp in the vertical direction as well as the balance between left and right is maintained.

Figure 8A:
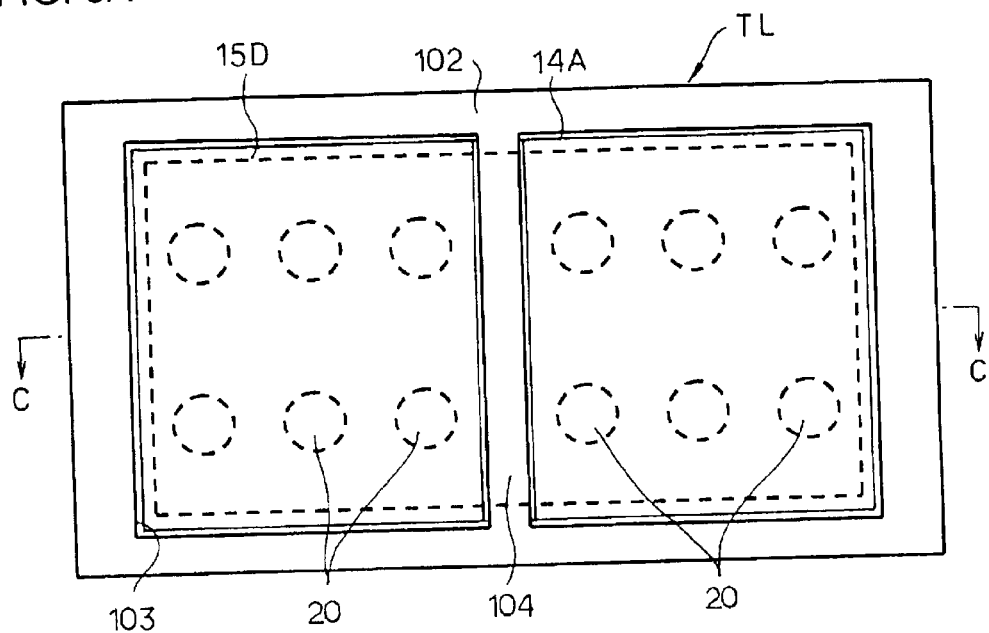
FIG. 8A shows a partially exploded front elevational view of a tail lamp of a fifth embodiment of the present invention.
Figure 8B:
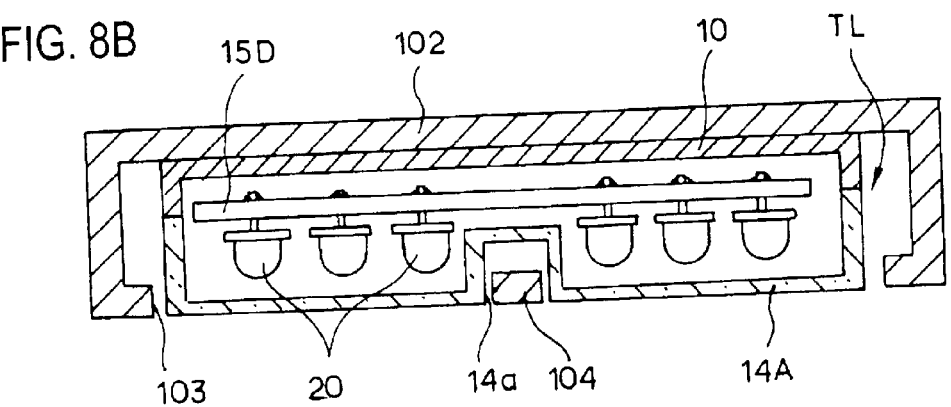
FIG. 8B illustrates a cross sectional view taken along the line, C—C.

FIG. 8A shows a front elevational view of the tail lamp of a fifth embodiment, and FIG. 8B shows a sectional view taken along the line, C—C. The fifth embodiment is configured such that one tail lamp appears as two tail lamps—one on the right side and the other on the left side. In other words, the configuration of a circuit board 15D, that is, the arrangement of the LED lines on the circuit board 15D and a connecting circuit, are almost the same as those shown in FIG. 5A. However, it differs in the fact that a margin of the central area including the first centerline is slightly larger. Moreover, in the tail lamp TL of this embodiment, a concave groove 14a, in which a lens 14A is provided along the centerline in the left-right direction, is provided inside a housing 102 that is provided on the vehicle body. The housing 102 is provided with a window portion 103 from which the lens 14A is seen, and the window portion 103 is provided with a vertical frame 104 at a position corresponding to the concave groove 14a. The vertical frame 104 is positioned inside the groove 14a when the tail lamp TL is mounted inside the housing 102. Therefore, the left and right areas of the lens 14A seen from the window portion 103 of the housing 102 are defined by the vertical frame 104, making both areas appear as if they are separate tail lamps.

In the tail lamp of the fifth embodiment, because the arrangement of the LEDs is almost the same as that in the second embodiment, when any one of the LEDs becomes incapable of emitting light, all LEDs in the LED line shut down. Therefore, a balance between left and right as an overall lamp is maintained. Also, in this embodiment, because the left and right lamps appear as if they are two separate lamps defined by the vertical frame 104, the effect of maintaining a balance between left and right sides of the lamp that is constituted by "two separate" lamps can be obtained.

Figure 9:
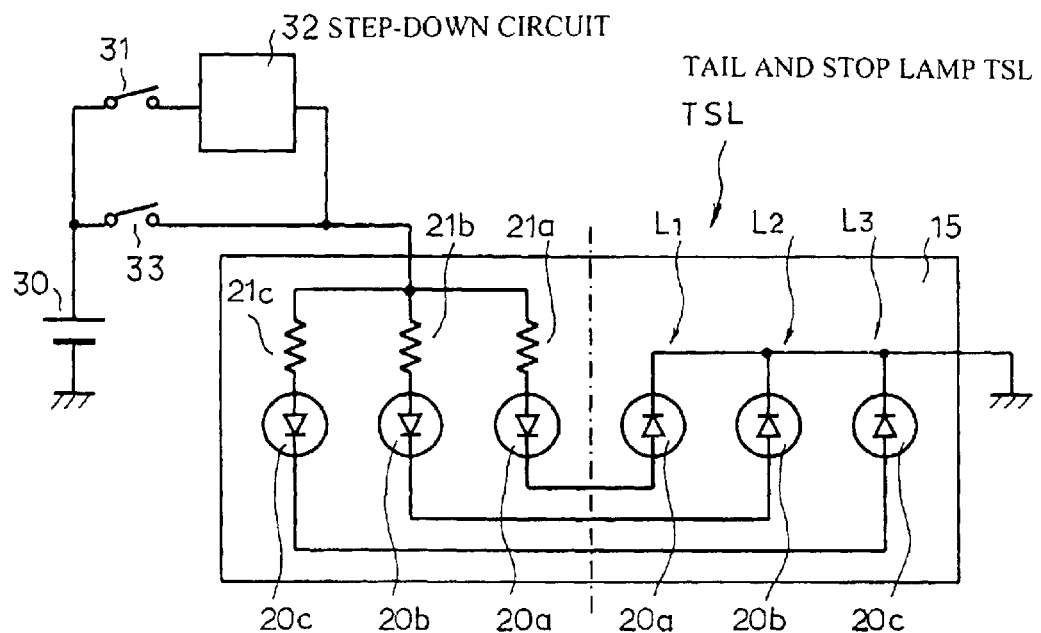
FIG. 9 shows a front elevational view including a circuit configuration of a tail and stop lamp according to another embodiment of the present invention.
Figure 10A:
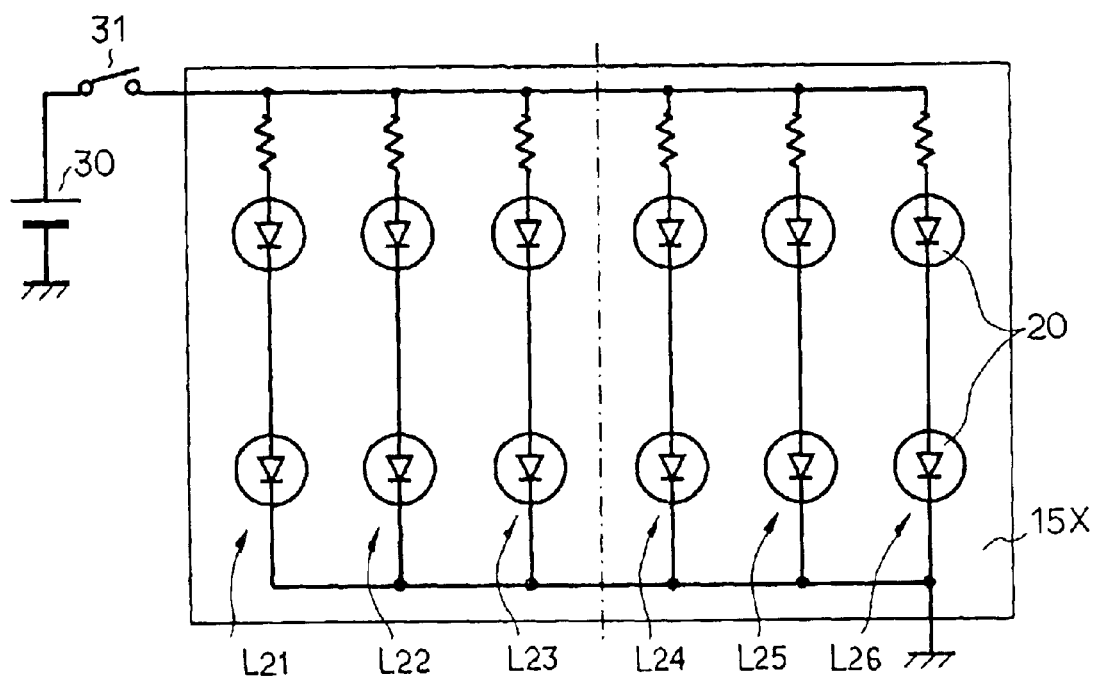
FIG. 10A shows a front elevational view of a circuit board including a circuit configuration of a conventional tail lamp.
Figure 10B:
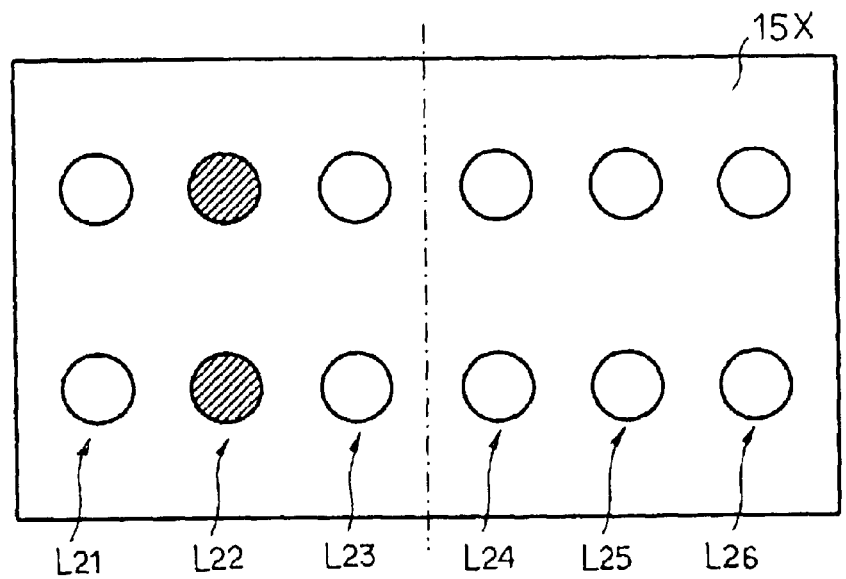
FIG. 10B illustrates a state where some LEDs are out.

In the above embodiments, the examples are shown where the present invention is applied to tail lamps of two-wheeled vehicles. However, the present invention can be applied not only for two-wheeled vehicles but also for automobiles (four-wheeled vehicles) with high mount stop lamps. For example, FIG. 9 shows an example where the lamp shown in the first embodiment of the present invention is applied to tail and stop lamp TSL of a two-wheeled vehicle. As shown in FIG. 9, the first to third LED lines L1, L2 and L3 constituting the circuit board 15 are connected in parallel, and connected to the electric power supply 30 via the step-down circuit 32 and tail lamp switch 31. Also, the LED lines L1, L2 and L3 are connected to the electric power supply 30 via a stop lamp switch 33 in parallel with each other. In the step-down circuit 32, voltage from the electric power supply 30 is reduced due to resistance, or effective voltage is reduced in a chopper circuit. In this tail and stop lamp TSL, the LEDs in individual LED lines L1, L2 and L3 emit light at a lower intensity due to the reduced voltage from the electric power supply 30 when the tail lamp switch 31 is turned on, whereas the LEDs emit light at a higher intensity due to the voltage from the electric power supply 30 when the stop lamp switch 33 is turned on. In this case also, even when the LEDs in the tail and stop lamp TSL become incapable of emitting light, a left and right balance can be maintained.

The above embodiment is the basic configuration of the present invention, and thus the number of LED constituting the LED line, or the number of LED lines can be changed as appropriately depending on the required number of LEDs. Also, LEDs constituting an LDE line can be vertically and symmetrically arranged according to the type of the lamp.

Also, in the present invention, the arrangement on an identical flat surface such as a circuit board is not required. The present invention can be applied when LEDs are arranged in one or two dimensions when viewed from the front of the lamp, where the LEDs are arranged on a plurality of circuit boards, even with some dents and bumps. Furthermore, an light-emitting element is not limited to LED. The LED is not limited to a discrete LED but can be a chip type LED.

In a vehicular lamp of the present invention, a plurality of LEDs are connected in series by an LED line, and a plurality of the LED lines are connected in parallel. The LEDs and the LED lines are arranged in a flat plane and face the front of the lamp. The plurality of LEDs are arranged symmetrically with respect to a first centerline when viewed from the front of the lamp. Therefore, even when any one of the LEDs in the plurality of the LED lines becomes incapable of emitting light and thus all LEDs in a LED line become incapable of emitting light, because the LEDs in the LED line are arranged symmetrically, a symmetrical balance is maintained. That is, the overall symmetrical appearance of the lamp can be preserved.

Other implementations are within the scope of the following claims.

What is claimed is:

1. A vehicular lamp comprising:
    a plurality of light emitting elements; and
    a plurality of light emitting element lines, each light emitting element line separately connecting a different respective plurality of the light emitting elements in series,
    wherein the light emitting elements connected in series by any one of the light emitting lines are symmetrically disposed about a first centerline bisecting the vehicular lamp from a frontal view of the vehicular lamp, and
    wherein a plurality of light emitting elements, which are arranged along an imaginary, substantially straight line that intersects and is perpendicular to the first centerline, correspond, respectively, to at least two different light emitting element lines.

2. A vehicular lamp according to claim 1 including at least one light-emitting element disposed on the first centerline.

3. A vehicular lamp according to claim 1, wherein the light-emitting elements connected in series by any one of the light-emitting element lines are disposed symmetrically with respect to a second centerline of the plane, said second centerline being perpendicular to the first centerline.

4. A vehicular lamp according to claim 1, wherein a frontal area of the lamp along the first centerline is covered by a part of a vehicle body, and the lamp appears as two separate lamps on both sides of the part of the vehicle body.

5. A vehicular lamp according to claim 1, wherein the light emitting elements are disposed on a circuit board.

6. A vehicular lamp according to claim 1, wherein the light emitting element lines are electrically connected in parallel with each other on a circuit board.

7. A vehicular lamp comprising:
    a plurality of light emitting elements; and
    a plurality of light emitting element lines, each light emitting element line separately connecting a different respective plurality of the light emitting elements in series,
    wherein the light emitting elements connected in series by any one of the light emitting lines are symmetrically disposed about a first centerline bisecting the vehicular lamp from a frontal view of the vehicular lamp, and
    wherein the light-emitting elements connected in series by any one of the light-emitting element lines are disposed symmetrically with respect to a second centerline of the plane, said second centerline being perpendicular to the first centerline.

8. A vehicular lamp according to claim 7 including at least one light-emitting element disposed on the first centerline.

9. A vehicular lamp according to claim 7, wherein a frontal area of the lamp along the first centerline is covered by a part of a vehicle body, and the lamp appears as two separate lamps on both sides of the part of the vehicle body.

10. A vehicular lamp according to claim 7, wherein the light emitting elements are disposed on a circuit board.

11. A vehicular lamp according to claim 7, wherein the light emitting element lines are electrically connected in parallel with each other on a circuit board.

* * * * *